(12) United States Patent
Kahle et al.

(10) Patent No.: US 6,477,635 B1
(45) Date of Patent: Nov. 5, 2002

(54) DATA PROCESSING SYSTEM INCLUDING LOAD/STORE UNIT HAVING A REAL ADDRESS TAG ARRAY AND METHOD FOR CORRECTING EFFECTIVE ADDRESS ALIASING

(75) Inventors: James Allan Kahle; George McNeil Lattimore; Jose Angel Paredes; Larry Edward Thatcher, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,862

(22) Filed: Nov. 8, 1999

(51) Int. Cl.[7] .............................................. G06F 12/10
(52) U.S. Cl. ........................ 711/210; 711/146; 711/220
(58) Field of Search .................................. 711/202, 203, 711/210, 220, 221, 146, 122

(56) References Cited

U.S. PATENT DOCUMENTS

| | | | | |
|---|---|---|---|---|
| 5,168,560 A | * | 12/1992 | Robinson et al. | 711/123 |
| 5,499,204 A | * | 3/1996 | Barrera et al. | 365/49 |
| 5,890,221 A | * | 3/1999 | Liu et al. | 711/210 |
| 6,202,128 B1 | * | 3/2001 | Chan et al. | 711/131 |
| 6,266,768 B1 | * | 7/2001 | Frederick, Jr. et al. | 712/220 |

* cited by examiner

Primary Examiner—Glenn Gossage
(74) Attorney, Agent, or Firm—Kelly K. Kordzik; Winstead Sechrest & Minick P.C.; Anthony V. S. England

(57) ABSTRACT

A data processing system including a processor having a load/store unit and a method for correcting effective address aliasing. In the load/store unit within the processor, load and store instructions are executed out of order. The load and store instructions are assigned tags in a predetermined manner, and then assigned to load and store reorder queues for keeping track of the program order of the load and store instructions. A real address tag is utilized to correct for effective address aliasing within the load/store unit.

14 Claims, 7 Drawing Sheets

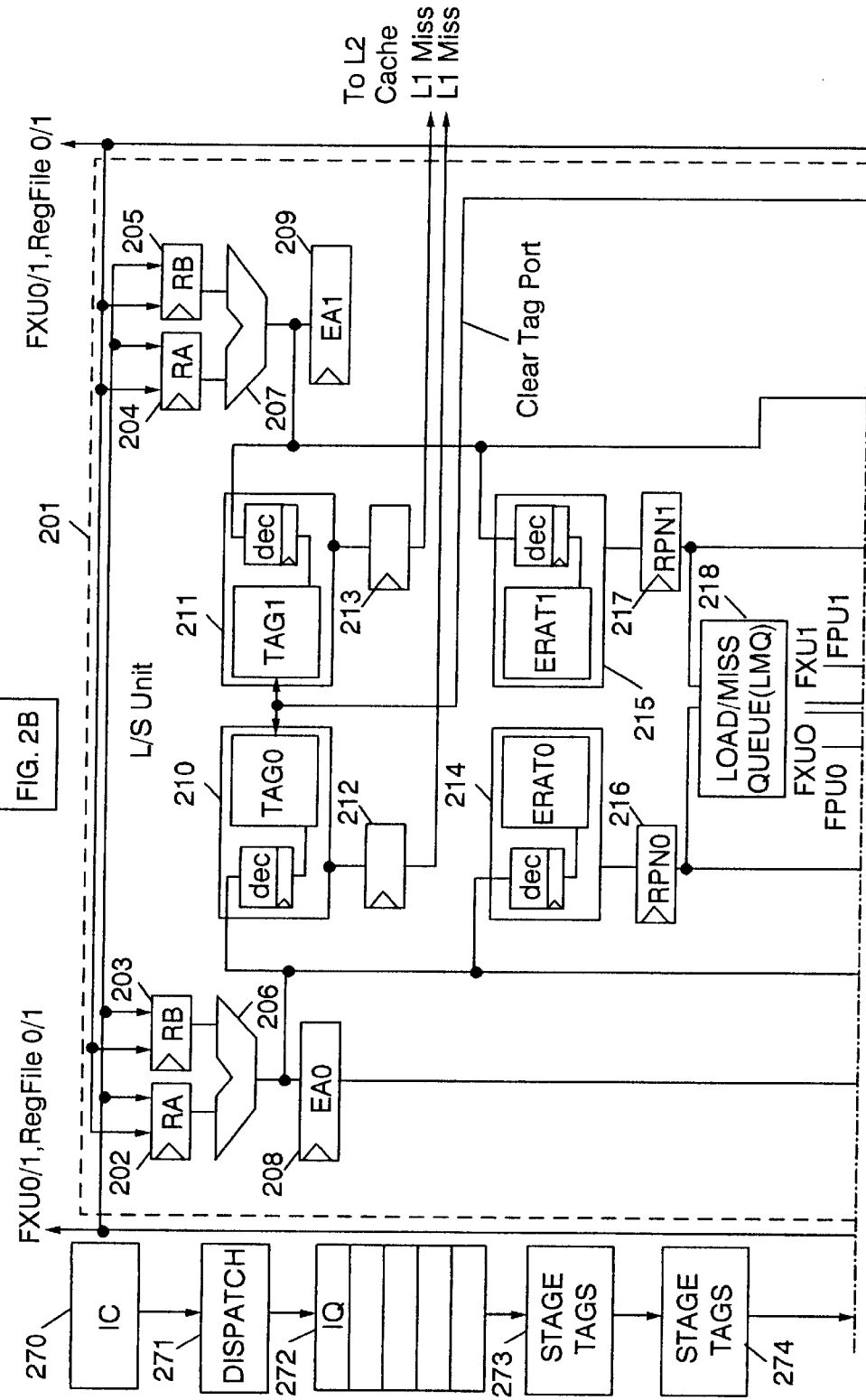

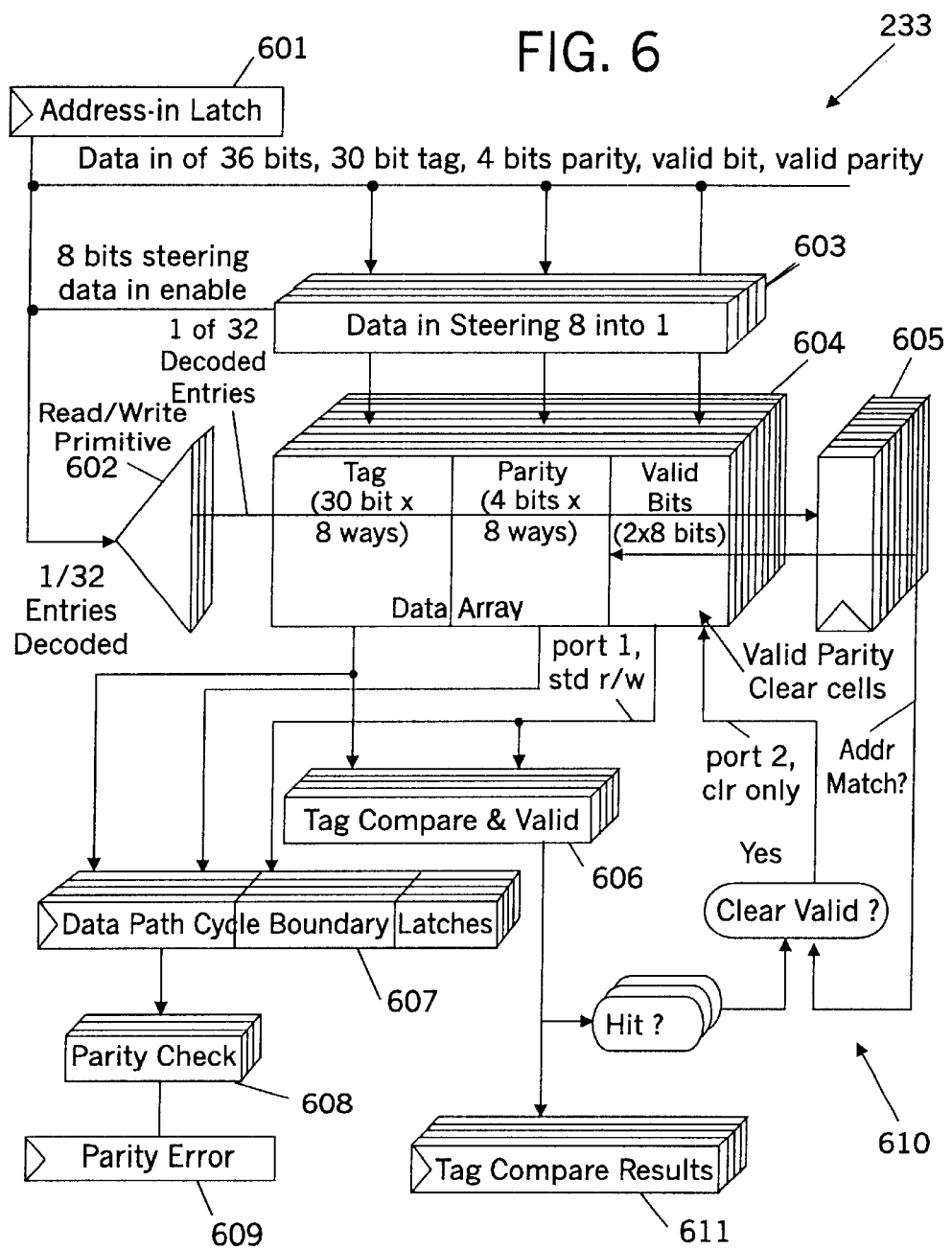

DATA PROCESSING SYSTEM INCLUDING LOAD/STORE UNIT HAVING A REAL ADDRESS TAG ARRAY AND METHOD FOR CORRECTING EFFECTIVE ADDRESS ALIASING

CROSS REFERENCE TO RELATED APPLICATIONS

The present invention is related to the following patent applications:

U.S. patent application Ser. No. 09/263,665, entitled "System and Method for Store Forwarding," now U.S. Pat. No. 6,349,382;

U.S. patent application Ser. No. 09/213,331, entitled "System and Method for Permitting Out-of-Order Execution of Load and Store Instructions", now U.S. Pat. No. 6,301,654;

U.S. Patent Application Ser. No. 09/259,140, entitled "System and Method for Executing Store Instructions", now U.S. Pat. No. 6,336,183; and and U.S. patent application Ser. No. 09/259,139, entitled "System and Method for Merging Multiple Outstanding Load Miss Instructions," now U.S. Pat. No. 6,336,168, which are all hereby incorporated by reference herein.

TECHNICAL FIELD

The present invention relates in general to data processing systems, and in particular, to the execution of load and store instructions in a processor.

BACKGROUND INFORMATION

In order to increase the operating speed of microprocessors, architectures have been designed and implemented that allow for the out-of-order execution of instructions within the microprocessor. An advantage of out-of-order execution of instructions is that it allows load miss latencies to be hidden while useful work is being performed. However, traditionally, load and store instructions have not been executed out of order because of the very nature of their purpose. For example, if a store instruction is scheduled to be executed in program order prior to a load instruction, but the processor executes these two instructions out of order so that the load instruction is executed prior to the store instruction, and these two instructions are referring to the same memory space, there is a likelihood that the load instruction will load incorrect, or old, data since the store instruction was not permitted to complete prior to the load instruction.

The above referenced patent applications implement various techniques within a load/store unit for increasing the throughput of instructions through the unit. Within the load/store unit, effective addresses are calculated and utilized. Problems can occur within the load/store unit as a result of effective address (EA) aliasing. EA aliasing is when different EAs point to the same real address (RA). Since the L1 (level 1 or primary) cache is EA addressed (EA 50:51 are not equal to RA 50 51), two effective addresses, EA1 and EA2 cannot both be in the cache at the same time. Therefore, what is needed in the art is a technique for dealing with such EA aliasing.

SUMMARY OF THE INVENTION

The present invention addresses the foregoing problem by implementing an RA (real address) tag array. When a cache reload occurs, the RA tag array detects the EA alias and clears the cache of the first alias and reloads the cache at the second alias. On aliases, the data is moved by creating a cache miss and reloading from the L2 (level 2 or secondary) cache into the new alias and clearing the old alias. Essentially, the RA tag directory or array is used to handle the aliasing conflicts. The RA tag is also used for snoops. Since the L1 cache is inclusive, if a line is snooped out of the L2 cache, the corresponding line in the L1 cache must be invalidated. The occurrence of the cache line in the directories is found using the RA tag in the RA tag array.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2, 2A and 2B together, illustrate a load/store unit configured in accordance with the present invention;

FIG. 6 illustrates further detail of a real address tag array in accordance with the present invention.

DETAILED DESCRIPTION

Figure 1:
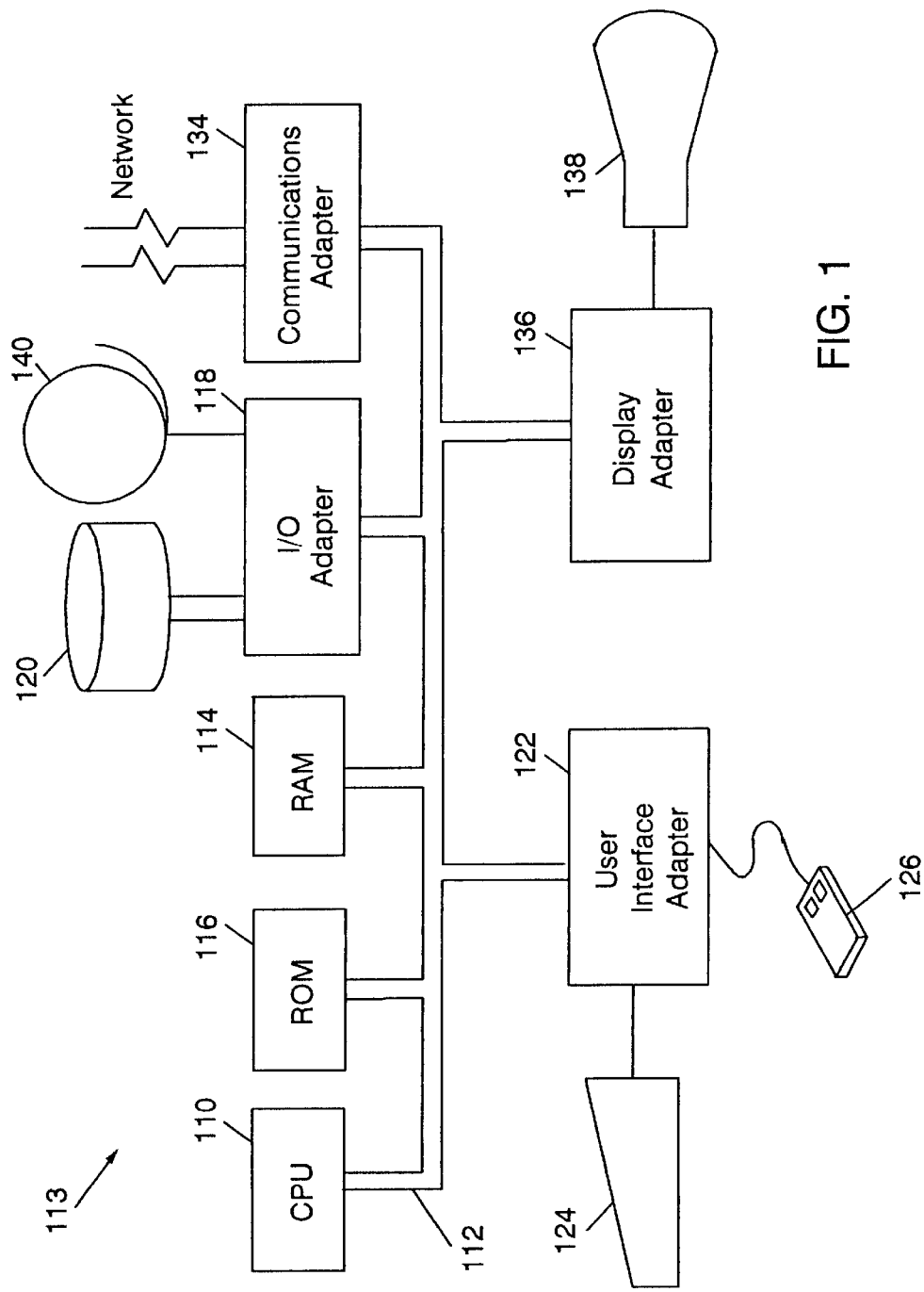
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, and a number of other units interconnected via system bus 112. CPU 110 embodies the load/store unit 201 of the present invention as described below. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communications adapter 134 for connecting workstation 113 to a data processing network, and display adapter 136 for connecting bus 112 to display device 138. CPU 110 may include other circuitry (other than load/store unit 201) not shown herein, which will include circuitry commonly found within a microprocessor, e.g, execution unit, bus interface unit, arithmetic logic unit, etc CPU 110 may also reside on a single integrated circuit.

Figure 2B:
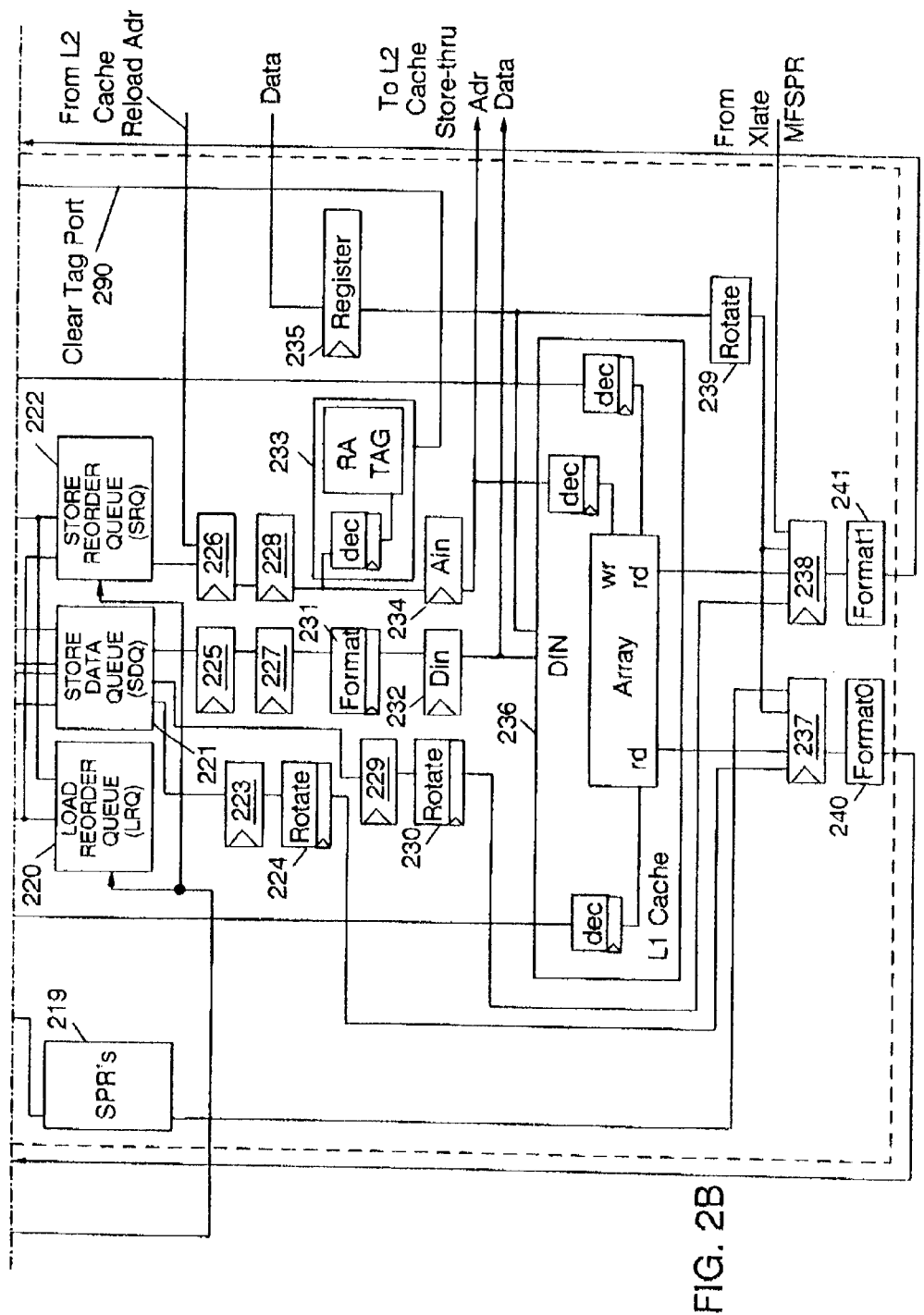

FIGS. 2, 2A and 2B together illustrate load/store (L/S) unit 201 configured in accordance with the present invention. L/S unit 201 is located within CPU 110, which may be configured in accordance with typical microprocessor architectures.

L/S unit 201 has two pipelines so that two load or store instructions can be issued per machine cycle. Registers 202–205 receive instructions from fixed point units (FXUs) 0 and 1 (not shown) in a manner well-known in the art. 64-bit adder 206 adds operands received from registers 202 and 203, while 64-bit adder 207 adds operands from registers 204 and 205 to produces a pair of 64-bit effective addresses (EAs). These effective addresses are outputted to registers 208 and 209, respectively. Registers 208 and 209 capture the effective addresses (EA). They then both feed LMQ (load miss queue) 218, LRQ (load reorder queue) 220 and SRQ (store reorder queue) 222, which all need a portion of the EA in addition to the real address from registers 216 and 217 to perform address checking. Additionally, the effective addresses are decoded to access tag arrays 210 and 211 to determine if there is a hit or a miss within L1 cache 236 (FIG. 2B). If there is a miss, then the addresses are passed through registers 212 and 213 and sent to the L2 cache (not shown).

Furthermore, the effective addresses are sent from adders 206 and 207 to be decoded and to access the effective real address translator (ERAT) arrays 214 and 215, respectively, which output translated addresses through registers 216 and 217.

Further, the effective addresses from adders 206 and 207 access the L1 cache 236 for the load operation after being decoded by the decoders within the L1 cache 236. If there is a hit in the L1 cache 236, then the data is read out of the L1 cache 236 into registers 237, 238, and formatted by formatters 240, 241, and returned on the result bus to be sent to a register file (RegFile) (not shown). The cache line read out of L1 cache 236 is also returned into the registers 202–205 for operations that are dependent on the result as an operand.

Essentially, the three cycles performed within L/S unit 201 are the execute cycle (where the addition is performed), the access cycle (where access to the arrays is performed), and the result cycle (where the formatting and forwarding of data is performed).

If there is a miss in the cache, the request is then sent down to the L2 cache (not shown). The load miss queue (LMQ) 218 waits for the load data to come back from the L2 cache (not shown). The data associated with that cache line is loaded into the L1 cache 236.

These load operations can be performed speculatively and out of orders. Store instructions are also executed out of order. Store instructions are divided into store address and store data instructions. The individual instructions are executed as soon as their operands are available and an execution unit is available to execute them. Store address instructions are translated and put in the store recorder queue (SRQ) 222. Store data instructions read the FXU (fixed point unit) or FPU (floating point unit) register file and send the result to be written in the store data queue (SDQ) 221 to wait their turn to write to the L1 cache 236. Therefore, store instructions are executed out of order, but written into the L1 cache 236 in order.

The SRQ 222 keeps track of store instructions that have been executed. SRQ 222 maintains the store instructions in the queue and determines when the data is available in the SDQ 221 and when the store instruction is next to complete. The store to the L1 cache 236 is then completed.

Many of the registers 223, 225–229, and 237–238, are utilized for timing.

Cache lines within the L1 cache 236 are accessed based on the effective address of the cache line. The RA tag array 233 keeps track of where in the L1 cache 236 a cache line was written. The format block 231 takes the data from the SDQ 221 and rotates it properly to write into the correct byte positions in the L1 cache 236 upon execution of the store instruction.

Rotate blocks 224 and 230 are utilized for store forwarding. Therefore, if there is a store instruction that is sitting in the store queue and has not been written into the cache/memory subsystem yet because it is not next to complete, and then a younger load instruction is received that needs that data, the data will be forwarded to the load instruction being executed (see FIG. 4). To simplify store forwarding, and store writes, when data is transferred to the SDQ 221, the data is rearranged so that the data corresponding to the location in memory of the store address is written into the first byte of the SDQ 221 entry, the store address +1 into the second byte, etc. The data is arranged in the order written to memory, but is byte-aligned. When the data is written to the L1 cache 236, it is rotated (blocks 224 and 230) so that the data is double-word aligned.

Rotate block 239 is utilized to rotate data received from the L2 cache (not shown) in response to an L1 cache miss, for forwarding the data from the L2 cache on to the result bus for forwarding to the proper register file.

Block 219 contains a number of special purpose registers to store data as a result of special purpose register instructions and read data from these registers so they get into the normal pipeline.

Register 235 is implemented for timing purposes to stage data from the L2 cache (not shown). Format blocks 240 and 241 format (or shift) cache data into the proper byte positions for the load result to the register file.

In one embodiment of the present invention, an effective address comprising 64 bits and its corresponding 64-bit real address may only have the four kilobyte page offset address bits 52 63 as equal. The cache address may comprise bits 50:63, while the cache RA tag address will be comprised of bits 22:51 of the real address. Cache aliasing is created when the effective address is used to address the cache and bits 50 51 of the effective address do not match RA bits 50 51. When only the RA is known, it may exist in one of four locations in the cache. The RA tag algorithms (FIGS. 3–5) of the present invention solve the conversion from RA to EA to allow correct addressing of an EA addressed cache or array. The RA tag is used to perform real address stores, snoop invalidates, and cache reloads.

Referring next to FIG. 6, there is illustrated further detail of RA tag 233. In one implementation of RA tag 233, there are included eight sub-RAMs (also referred to as data array or tag array) 604 with 32 entries in each. There are 30 bits of tag, plus 4 bits of parity, one valid bit and one valid parity bit. An address will be received into latch 601 where it is then broken up to be decoded in decoder 602 and the data goes into array 603. The outputs of decoder 602 and array 603 are received into the data array 604. The decoded portion gets saved in latches 605 so that they can be used for clearing if the result of the tag compare in tag compare and valid block 606 is positive. The comparison data is saved within register 611. If the compare is positive, there is a hit. A clear valid signal is generated when there is a proper hit in the RA tag 233. This can occur as a result of a snoop hit to the RA tag 233 or a reload instance to aliased lines. This is produced by tag compare and valid block 606. Register 605 holds the address of the line that could create a clear valid signal. These are used to index an array if a clear valid signal is asserted for the RA_tag array 604. The clear valid signal and associated address are also sent to the tag arrays 210 and 211 (FIG. 2A). These addresses are pipelined through staging latches 212 and 213 (FIG. 2A). Additionally, simultaneously, the data is stored in cycle boundary latches 607 in order to compute a parity check in block 608 and report any parity error in block 609.

Within the RA tag 233, only a one-to-one mapping is allowed between an effective address and a real address. However, the architecture permits four effective addresses to map to one real address. Therefore, for example, if a store operation is performed to a particular effective address, and then a load operation also is performed to that same effective address, the system needs to be sure that the proper data is loaded. Essentially what the present invention does is to undo the map of the first effective address to the real address when a new effective address is processed, and then a map is plotted between the new effective address and the real address so that at any given time there is only one mapping of an effective address to a real address.

In a 64-bit address, the effective address comprises bits 50:63, while the RA tag 233 uses bits 22:51. As a result, bits 50 and 51 overlap, which results in the aliasing problem. Therefore, if an effective address is used to access array 604 within RA tag 233, there are four possible matches.

Within the RA tag 233, a real address will be received and decoded and compared to other real addresses within array 604. When a match, or hit, occurs, bits 50 and 51 associated with the address found in array 604 are calculated. Each of the four comparators 606 correspond to the four values represented by bits 50:51. The first comparator represents value '00'b. The second represents value '01'b, the third '10'b, and the fourth '11'b. The comparator 606 that matches identifies the effective address of bits 50 51. This is how the EA address is calculated for steps 306, 406, and 506 described below with respect to FIGS. 3–5, respectively. These bits 50:51 are used to address the tag arrays 210 and 211 (FIG. 2A).

A snoop address is presented as a real address to the RA tag 233. After the EA address is calculated with the comparator 606, an EA address with bits 50:51 can be used to address the tag arrays 210 and 211 (FIG. 2A).

Figure 3:
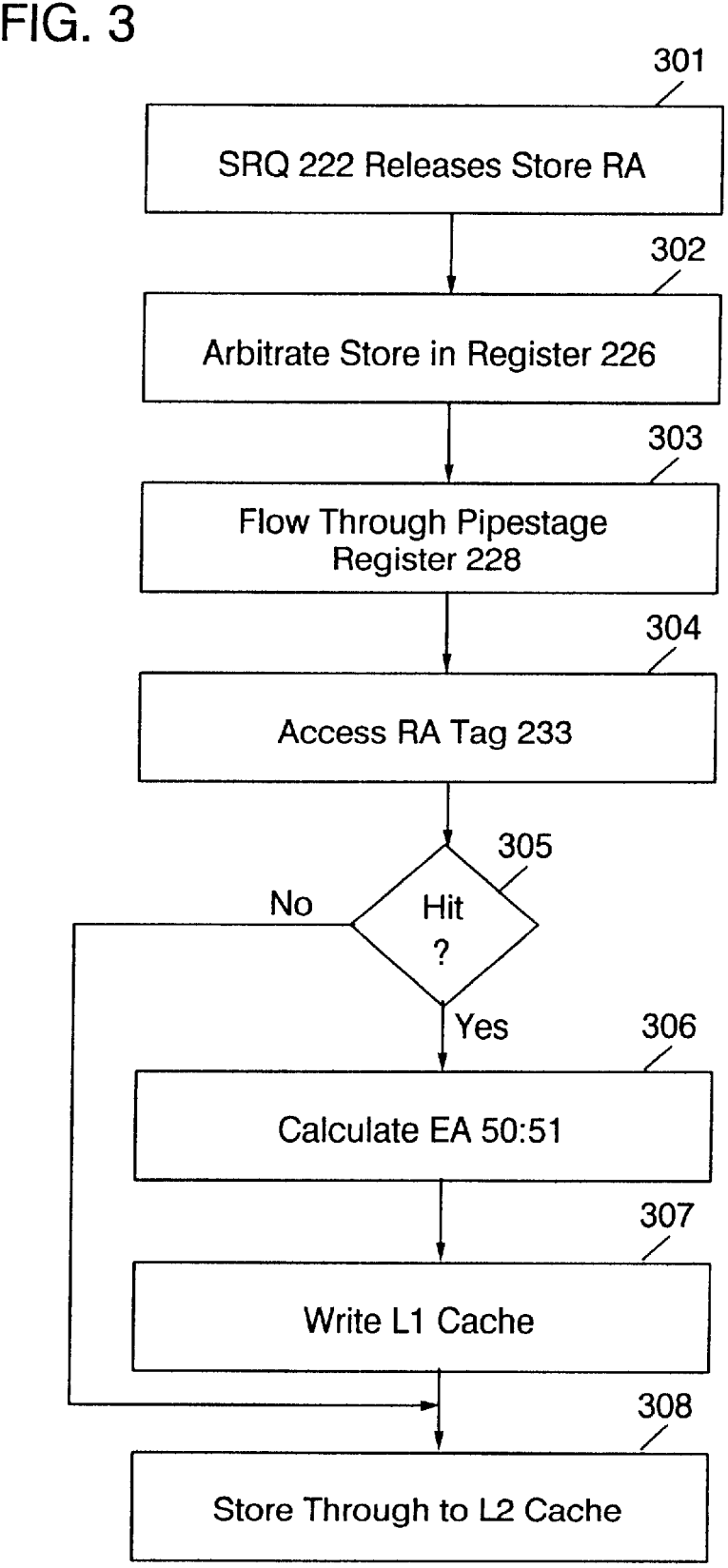
FIG. 3 illustrates a process for performing store operations in accordance with the present invention.

Referring to FIG. 3, there is illustrated a process for performing a store operation in accordance with the present invention. In step 301, in a manner as described above, the store reorder queue 222 will release a store real address (RA). This address will be received in register 226, which will select this address in accordance with an arbitration process in step 302, which address will then be passed through pipe stage register 228 in step 303. The details for the arbitration process in step 302 are not critical to the description of the present invention. Thereafter, in step 304, the store real address will be used to access RA tag 233 as described above. In step 305, if there is not a hit within RA tag 233, the process forwards to step 308. However, if there is a hit, then the process proceeds to step 306 to calculate the effective address as described above. This effective address will then be utilized in step 307 to write the data associated with the store address into the L1 cache 236, and then in step 308, the data is stored through to the L2 cache.

Figure 4:
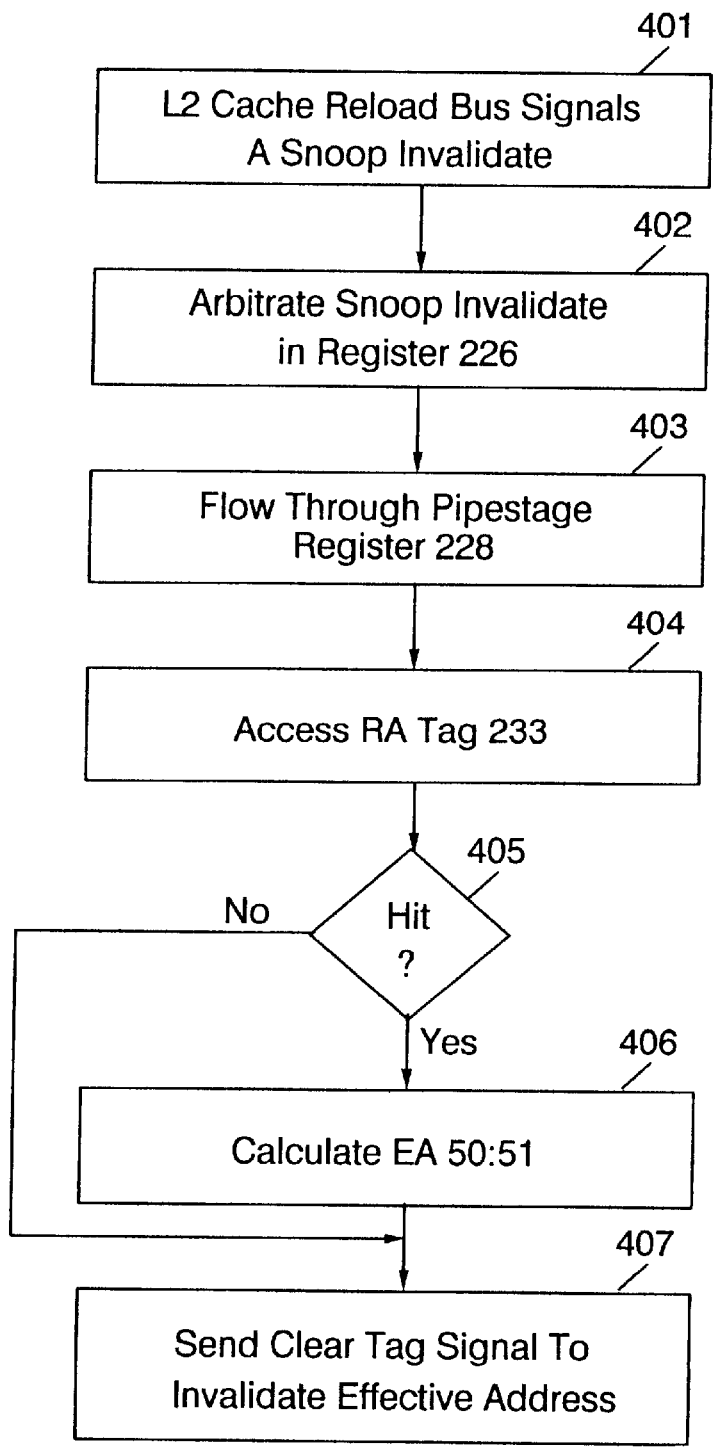
FIG. 4 illustrates a process for performing snoop invalidate operations in accordance with the present invention.

Referring next to FIG. 4, there is illustrated a process (algorithm) for performing snoop invalidate operations in accordance with the present invention. In step 401, an L2 cache reload address is received as bus signals into register 226, indicating a snoop invalidate. An arbitration process, in a manner as similarly described above with respect to FIG. 3, is performed to pass the snoop invalidate (address) signals through register 226 in step 402. In step 403, this reload address is then passed through pipe stage 228, and is then used in step 404 to access RA tag 233. In step 405, if there is not a hit within RA tag 233, the process will proceed to step 407. However, if there is a hit, in step 406, the effective address is calculated, and then used to send a clear tag signal in step 407 on line 290 to tag arrays 210 and 211 (FIG. 2A) to invalidate that effective address should it reside within either of those arrays.

Figure 5:
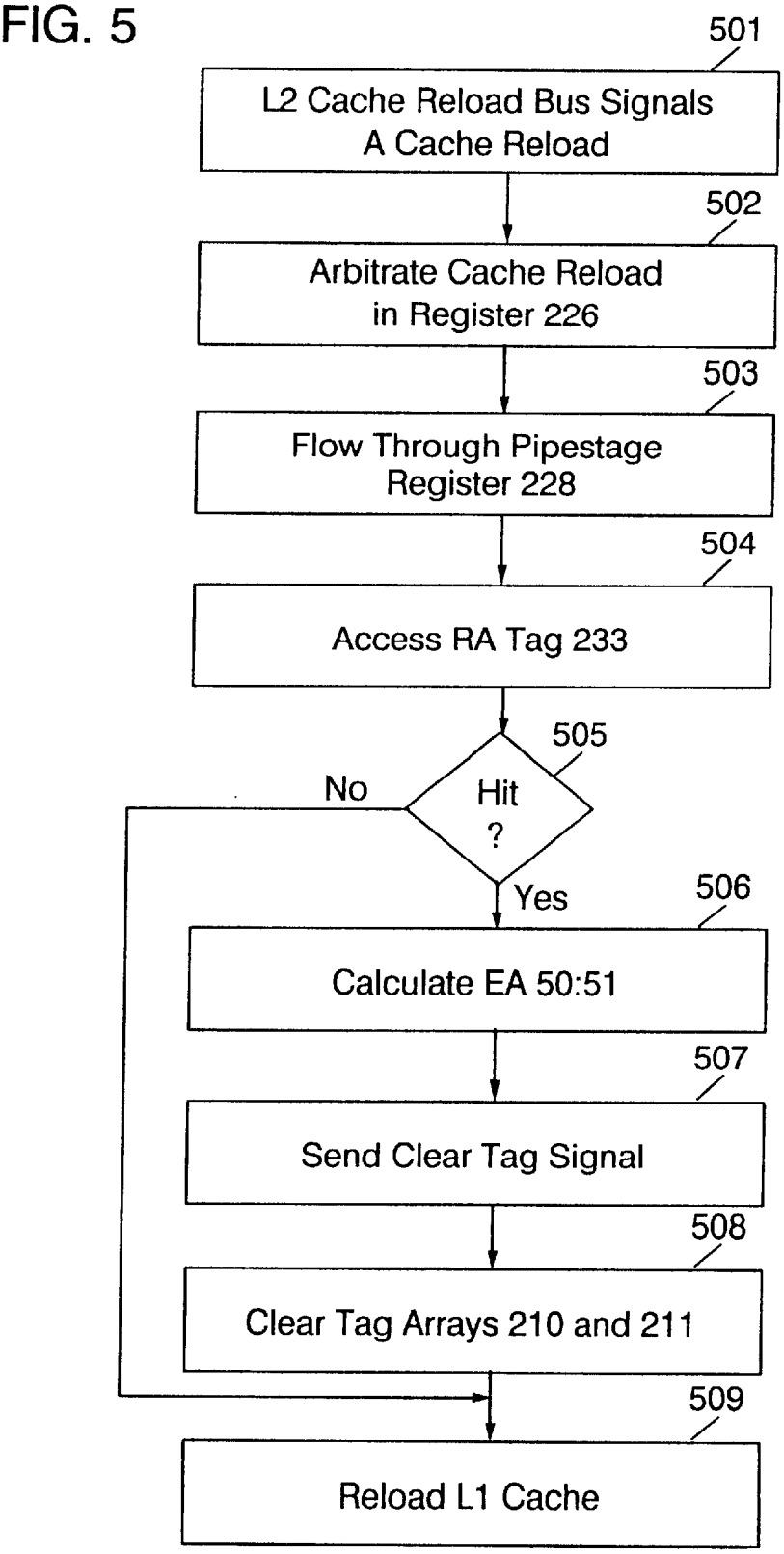
FIG. 5 illustrates a process for performing cache reload operations in accordance with the present invention.

Referring next to FIG. 5, there is illustrated a process for performing a cache reload process in accordance with the present invention. In step 501, an L2 cache reload address is received as bus signals into register 226, indicating a cache reload, and then passed through in a manner as described above with respect to FIGS. 3 and 4 through registers 226 and 228 in steps 502 and 503 to be used to access RA tag 233 in step 504. In step 505, if there is a hit within RA tag 233, then in step 506, the effective address corresponding to the hit is calculated and this effective address is used to send the clear tag signal in step 507 on line 290 to tag arrays 210 and 211 (FIG. 2A) to clear those arrays of that effective address in step 508. Thereafter, in step 509, the L1 cache 238 is reloaded.

Although the present invention and its advantages have been described in detail, it should be understood that various changes, substitutions and alterations can be made herein without departing from the spirit and scope of the invention as defined by the appended claims.

What is claimed is:

1. A processor comprising
    a load/store unit having a level one (L1) cache and coupled to a memory subsystem, the load/store unit further having a real address tag array for correcting effective address aliasing within the load/store unit, wherein the load/store unit further comprises:
    circuitry for receiving an L1 cache reload from the memory subsystem,
    circuitry for comparing a real address of the L1 cache reload to addresses in the real address tag array,
    circuitry for calculating an effective address corresponding to the real address of the L1 cache reload if the comparison results in a hit,
    circuitry for using the calculated effective address to clear an effective address tag array of any corresponding effective address in the effective address tag array; and
    circuitry for reloading the L1 cache using the calculated effective address.

2. The processor as recited in claim 1, wherein the load/store unit further comprises:
    circuitry for receiving an address corresponding to a store request, circuitry for comparing the address of the store request to addresses in the real address tag array;

circuitry for calculating an effective address corresponding to the address of the store request if the comparison results in a hit, and circuitry for loading the L1 cache using the calculated effective address.

3. The processor as recited in claim 2, wherein the load/store unit further comprises circuitry for storing to the memory subsystem using the calculated effective address.

4. A processor comprising a load/store unit having a level one (L1) cache and coupled to a memory subsystem, the load/store unit further having a real address tag array for correcting effective address aliasing within the load/store unit, wherein the load/store unit further comprises:

circuitry for receiving a snoop invalidate from the memory subsystem;

circuitry for comparing a real address of the snoop invalidate to addresses in the real address tag array;

circuitry for calculating an effective address corresponding to the real address of the snoop invalidates if the comparison results in a hit, and circuitry for using the calculated effective address to clear an effective address tag array of any corresponding effective address in the effective address tag array.

5. In a processor having a load/store unit coupled to an L1 cache and a level two (L2) cache, a method comprising the steps of receiving a real address within a real address tag array in the load/store unit, and correcting effective address aliasing within the load/store unit corresponding to the real address, wherein the correcting step further comprises the steps of receiving an L1 cache reload from the L2 cache, comparing a real address of the L1 cache reload to addresses in the real address tag array, calculating an effective address corresponding to the real address of the L1 cache reload if the comparison results in a hit, using the calculated effective address to clear an effective address tag array of any corresponding effective address in the effective address tag array, and reloading the L1 cache using the calculated effective address.

6. The method as recited in claim 5, wherein the correcting step further comprises the steps of receiving a snoop invalidate from the L2 cache, comparing a real address of the snoop invalidate to addresses in the real address tag array, calculating an effective address corresponding to the real address of the snoop invalidate if the comparison results in a hit, and using the calculated effective address to clear an effective address tag array of any corresponding effective address in the effective address tag array.

7. The method as recited in claim 5, wherein the correcting step further comprises the steps of:

receiving an address corresponding to a store request;

comparing the address of the store request to addresses in the real address tag array;

calculating an effective address corresponding to the address of the store request if the comparison results in a hit; and loading the L1 cache using the calculated effective address.

8. The method as recited in claim 7, wherein the correcting step further comprises the step of storing to the L2 cache using the calculated effective address.

9. A data processing system comprising:

a processor including a load/store unit;

a primary cache, a secondary cache, and circuitry for coupling the processor to the primary cache and the secondary cache, wherein the load/store unit further comprises:

a real address tag array for correcting effective address aliasing within the load/store unit, wherein the load/store unit further comprises:

a latch receiving a primary cache reload from the secondary cache;

a tag comparator comparing a real address of the primary cache reload to addresses in the real address tag array;

circuitry for calculating an effective address corresponding to the real address of the primary cache reload if the comparison results in a hit;

a clear tag port using the calculated effective address to clear an effective address tag array of any corresponding effective address in the effective address tag array; and circuitry for reloading the primary cache using the calculated effective address.

10. The system as recited in claim 9, wherein the real address tag array is operable for correcting effective address aliasing for store, snoop invalidate and cache reload operations.

11. The system as recited in claim 9, wherein the load/store unit further comprises a latch receiving an address corresponding to a store request from a store reorder queue in the load/store unit;

a tag comparator comparing the address of the store request to addresses in the real address tag array;

circuitry for calculating an effective address corresponding to the address of the store request if the comparison results in a hit, and circuitry for loading the primary cache using the calculated effective address.

12. The system as recited in claim 11, wherein the load/store unit further comprises circuitry for storing to the secondary cache using the calculated effective address.

13. A data processing system comprising a processor including a load/store unit, a primary cache, a secondary cache, and circuitry for coupling the processor to the primary cache and the secondary cache, wherein the load/store unit further comprises a real address tag array for correcting effective address aliasing within the load/store unit wherein the load/store unit further comprises a latch receiving a snoop invalidate from the secondary cache, a tag comparator comparing a real address of the snoop invalidate to addresses in the real address tag array, circuitry for calculating an effective address corresponding to the real address of the snoop invalidate if the comparison results in a hit; and a clear tag port, coupling the real address tag array to an effective address tag array using the calculated effective address to clear the effective address tag array of any corresponding effective address in the effective address tag array.

14. In a processor having a load/store unit coupled to an L1 cache and an L2 cache, a method comprising the steps of:

receiving a real address within a real address tag array in the load/store unit, and correcting effective address aliasing within the load/store unit corresponding to the real address, wherein the correcting step further comprises the steps of:

receiving a snoop invalidate from the L2 cache;

comparing a real address of the snoop invalidate to addresses in the real address tag array;

calculating an effective address corresponding to the real address of the snoop invalidate if the comparison results in a hit; and using the calculated effective address to clear an effective address tag array of any corresponding effective address in the effective address tag array.

* * * * *